United States Patent Office 2,761,563
Patented Sept. 4, 1956

2,761,563

METHOD OF TREATING WATER

Hein Israel Waterman, Delft, and Roelof Sijderius, Arnhem, Netherlands, assignors to John C. van Dijk, Bernardsville, N. J.

No Drawing. Application October 28, 1952,
Serial No. 317,355

8 Claims. (Cl. 210—42.5)

This invention relates to a method for treating water to remove various organic substances contained in it. More specifically, it relates to a method for treating waste water from appropriate sources in order to recover organic compounds which are present in the water in low concentration and which are of substantial value. It also relates to the treating of surface water to render it more fit for drinking by making it more palatable and less odorous. The invention further relates to the treating of surface water, particularly from rivers and streams, to remove impurities and thus produce water usable in industrial plants.

The waste water of many industrial plants and other installations carries away with it valuable materials which, because of their low concentration in the water, are generally deemed impractical to recover. For example, the waste waters from food plants like packing or rendering houses and milk processing plants contain a number of important chemicals such as proteins, hormones, and vitamins; and waste waters from plants like flavor and cosmetic producers contain ingredients of the fine-chemical type which are handled in such plants.

In the use of surface waters from rivers, brooks, canals, lakes, and similar natural or artificial reservoirs for drinking or industrial purposes, difficulties are encountered due to impurities present in the water. The contamination of such waters by the waste water of industrial plants and households, which flows into the surface water, has made it necessary to purify such water on a large scale using biological, chemical and/or physical methods. These large scale methods, however, do not fully purify the water but always leave small amounts of impurities therein; particularly is this the case in winter time when the water temperature in many regions is low. For this reason, the water still retains a bad odor and a disagreeable taste. Frequently, too, chemical methods such as chlorination give rise to the formation of chlorine compounds like chlorophenols which often have a more disagreeable taste than the original materials.

In the case of water for industrial use, as in laundry, paper-making, and textile plants, steel mills, and the like, it is well known that the composition of the water with regard to various contaminants and impurities must meet certain minimum requirements. In these and other industries, particularly the chemical industry which has developed during the last decades, not only have minimum quality requirements been established, but there has been an increasing employment of river water and other surface waters, and with this has come the inevitable waste disposal resulting in an increasing pollution of these waters. These facts have helped to make the problem of efficient water purification more urgent.

The method proposed herein contemplates treating waste waters like those described to concentrate and separate organic compounds therefrom; treating impure surface waters to improve and render them potable and to purify them for industrial and household use; and treating industrial waste waters to relieve the danger of pollution by them. The method is further suitable for treating water that has previously been treated by common methods of purification, or water not previously treated in cases where such common methods are inadequate. The method is simple and practical and involves only a modest expenditure to be practiced.

The method provides for treating water having a low concentration of at least one organic substance and comprises adding to the water a very small amount of a substantially water-insoluble, emulsifiable oil, forming the oil and water into a stable oil-in-water emulsion wherein the oil particles in the emulsion attract or sorb the organic substance to form a system, then dispersing an emulsion-breaking agent in the emulsion to break the same, and separating the oil-organic substance system from the water. In the result the water is purified by the removal of the organic substance, and the latter may be isolated and recovered.

In the application of the method, the preferred oils are fatty acid oils like sesame, linseed, soya, corn, and arachis or peanut oil. Also preferred are the constituents of these naturally occurring oils, including olein, stearin, palmitin, myristin, linolein, sesamin, and the glycerides of arachidic, hypogaeic, and lignoceric acids. Besides the glycerides, other esters of the foregoing acids are suitable, for example the methanol, ethanol, propanol, and other preferably low molecular weight alkanol or alkanediol esters. Other fatty acid oils are aliphatic carboxylic acids having nine to twenty carbon atoms and their ester derivatives. Those acids and esters, including the esters previously described, that are solid at atmospheric temperatures may be liquefied or placed in a dispersed state by means of an emulsifying agent, as described hereinafter. A fatty acid like undecylenic acid is particularly suitable for producing drinking water as it exerts a bactericidal and/or bacteriostatic effect. These fatty acid oils are substantially insoluble in water and are readily emulsified with or without the aid of an emulsifying agent, the use of which may be desirable in some cases. Still other useful oils are mineral oils used in conjunction with an emulsifying agent. The mineral oils include petroleum, synthetic oils from the synthesis of carbon monoxide and hydrogen, hydrocarbons from coal, products of cracking, polymerization, hydrogenation, dehydrogenation, aromatization, solvent extraction, and various fractions and residues of these oils and oil products.

As emulsifying agents the following are useful: sodium stearate, potassium laurate, morpholine oleate, sodium lauryl sulfate, sodium 2-ethylhexyl sulfate, sodium xylenesulfonate, naphthalenesulfonate, sodium alkylnaphthalenesulfonate, sodium sulfosuccinate, sodium oleic acid sulfonate, sodium castor oil sulfonate, gylcerol monostearate containing a sodium fatty alcohol sulfate, glycerol monostearate containing a soap, lithium stearate, magnesium oleate, aluminum stearate, and quaternary ammonium salts and amine hydrochlorides. Particularly for producing drinking water, nonionic emulsifying agents are preferred, of which the following are examples: polyoxyethylene fatty alcohol ethers, polyglycol fatty esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylene-polyol fatty acid esters, polyol fatty acid monoesters, lecithin, polyhydric alcohol fatty acids esters, cholesterol fatty acid esters, lanolin, and oxidized fatty oils. Concentrations of the emulsifying agents are usually 0.5 to 5% by weight of the oil.

The quantity of oil is very small by comparison with the water to be treated and depends to some extent on the quantity of organic substances present in the water. For the preparation of drinking water from river water, a quantity of 2 to 10 gms. of oil per 1000 kg. of water generally is sufficient. For removing and recovering organic compounds, the quantity of oil may usually range from 2 to 50 or up to 1000 gms. per 1000 kg. of water. Where the water contains an unusually large amount of organic substances, a quantity of oil should be used which is capable of taking up the entire amount; and in such cases it may be desirable to apply an after-treatment with a smaller quantity of oil particularly where the water is to be used for drinking.

The organic substances may be truly or colloidally dissolved, or may be dispersed, in the water; their concentration, although variable, is usually very low, extending from amounts well below the lower limit of the quantity of oil used in the method to higher amounts. They may also be present in a concentration of the order of magnitude of the quantity of oil. They are sorbed by the oil during the treatment of the water to form an oil-organic substance system. In some instances the organic substances dissolve in the oil, but in any case, the oil particles have such an affinity or attraction for them that they are removed with the oil when the latter is separated from the water.

As noted, the oil is emulsified with the water to be treated, and this step takes place at normal atmospheric-water temperatures. A suitable procedure is to add the oil to a small amount of the water beforehand, form an emulsion and then add the latter to the balance of the water. The emulsion may be formed with the help of mechanical instruments like stirrers, jets, rotating and vibrating mixing installations, and other mechanisms which are in use or can be used for the making of dispersions. The emulsion is a stable one, and does not break by itself. After the oil is finely divided in the water to effect sorption of the organic substances, the oil-organic substance system is separated from the water, and for this purpose the emulsion is first broken by dispersing in it an emulsion-breaking agent. As the latter agent it is preferred to use finely divided particles of a water-insoluble solid material. These solid particles have an affinity for the particles of the oil-organic substance system such that the two kinds of particles adhere or are joined to one another and form settlable and/or filterable material which can be separated from the water by decanting or filtration. In this connection, it is sometimes possible to increase the speed of de-mixing by a slight variation in the pH value of the water, especially by varying the pH from the alkaline to the acid side. The solid particles may be added as such to the emulsion or may be produced in situ by the addition of an agent which forms in the water a finely divided solid material. Preferably, the solid particles are formed in situ in the emulsion by dispersing in it a water-soluble, hydrolyzable salt of a heavy bivalent or tervalent metal. Salts of tervalent metals, particularly of iron, are preferred and include ferric chloride and ferric nitrate. Aluminum chloride and aluminum sulfate are suitable, as are bivalent metal salts like zinc sulfate, zinc chloride, ferrous chloride, and ferrous sulfate. These salts are hydrolyzable in the water to form gelatinous precipitates which can be removed from the water together with the adherent oil-organic substance particles. Solid materials which may be added to the water as such in powdered form are kieselguhr, kaolin, alumina, iron oxide; also insoluble salts of the alkali and alkaline earth metals like calcium carbonate, calcium hypophosphate, calcium pyrophosphate, magnesium carbonate, magnesium hydroxide, magnesium pyrophosphate, barium carbonate, barium orthotriphosphate, barium sulfate, potassium metaphosphate, lithium orthosilicate, and lithium metasilicate; and fibre products like asbestos.

The adherent particles are in good condition to permit their removal from the water by filtration.

The emulsion may also be demulsified by dispersing therein agents which promote de-mixing by decreasing or neutralizing the action of the emulsifying material responsible for the emulsification. These demulsifiers include solvents for the responsible material, antagonists for destroying or neutralizing it, and electrolytes. While the choice of these demulsifiers will depend on the material responsible for the emulsification, some examples of useful demulsifiers are calcium hydroxide and calcium carbonate for breaking emulsions due to an anionic material; the tartrates and oxalates of alkali metals like sodium, potassium, and lithium for emulsions due to cationic materials; and, for emulsions produced by nonionic materials, alkanols like methanol, ethanol, propanol, etc., alkyl sulphonic acids having about 4 to 16 carbon atoms, sodium salts of the latter, aryl sulphonic acids like benzene sulphonic acid, para-toluene sulphonic acid, etc., and sodium salts of the latter. It is preferred to use a demulsifier which forms a precipitate in the emulsion. Mechanical means such as filters, upward flow filters, settlers, and centrifuges may be used to complete the separation of the phases.

For breaking the emulsion, a suitable pH for the latter is in the range of 6 to 8.

After separation of the adherent particles from the water, the method is completed so far as concerns the purification of water for drinking or industrial purposes, although the removed adherent particles may be reworked to regenerate the oil for reuse and to isolate the organic substance. If reworking is not desirable or practical, the adherent particles may be discarded or their removal from the water omitted. Discarding of the oily particles can be justified in view of the small amounts of oil involved. In some cases, as where reworking is not practical, it may be desirable to treat the water initially with an oil that is heavier than it, and after the resulting emulsion is broken, no separation of phases need be made, reliance being placed on the fact that when the water is returned to the river or stream, there will be time for the heavier phase to settle to the river bed where it will do no harm.

Where the recovery of organic compounds is to be effected, the separated adherent oily particles may be subjected to a suitable recovery step like distillation or solvent extraction to remove the organic compounds. Distillation using steam or vacuum is particularly suitable. The solid particles may or may not be first separated from the adhering oil-organic compound system. Separation of the organic compounds is feasible without first removing the solid particles, as illustrated hereinafter, whereas in some cases it may be desirable to first remove these solids and then to isolate the organic compound or compounds from the oil by conventional methods.

The invention may be illustrated by the following examples:

EXAMPLE 1

One hundred mgs. of sesame oil were divided in 50 gms. of water by stirring until an emulsion formed. A separate emulsifying agent was not required. The emulsion was added to 5 liters of bad smelling, disagreeably tasting river water and finely divided in the same by stirring. The river water had a permanganate consumption of 30 to 35 mgs. of potassium permanganate per liter. Then 175 mgs. of ferric chloride were introduced in this emulsion and agitated thoroughly, an iron-containing precipitate being formed which broke the emulsion. The precipitate was removed from the water by filtration. The filtered water did not have any disagreeable taste or smell. From the separated oil-containing precipitate there was isolated by means of a steam distillation the organic substance causing the bad odor and taste. The first quantities in particular of the distillate had a very penetrating odor. As a control, distilled water was treated as in the foregoing manner, and a totally odor-free distillate was obtained on distillation.

EXAMPLE 2

In a series of experiments the work of Example 1 was repeated but using each of the following oils in place of the sesame oil of that example and with different amounts up to 1000 gms. per 1000 kg. of water: peanut oil, arachide oil, olein, Edeleanu extract, tar oil, and a paraffin oil emulsified with triethanolaminestearate. The Edeleanu extract is the oil residue which results when a petroleum oil is treated with oleum, and as may be apparent, the residue is sulfonated. The tar oil is also referred to as anthracene oil or coal-tar creosote. An emulsifying agent was used only with the paraffin oil, the other oils being emulsifiable with the water on agitation. All of the oils successfully ameliorated the taste and the smell of the water.

EXAMPLE 3

To 3 liters of river water, freed from coarser impurities by sedimentation and having an oxygen consumption from permanganate of 7 to 12 p. p. m., 60 mgs. of sesame oil were added. By intensive stirring, the oil and water formed a milky emulsion. After this operation, and with the pH of the emulsion between 6 and 8, the emulsion was broken by the addition of a solution of ferric chloride containing 12 mgs. of iron per liter, and the resulting colloidal iron-containing precipitate was removed by filtration. The river water treated in this way was much better in quality as to odor and flavor than the starting material. When steam distilling the wet, oil-bearing precipitate, the first runnings of the steam distillate had a pervading smell, which, as shown by various experiments, was dependent on the nature and amount of odoriferous products in the original water. In other experiments like the foregoing, the results of which are set forth in Table I below, the oil was added as an emulsion prepared beforehand with a small amount of the water. All the experiments were carried out at room temperatures. In some of them the bad smelling compounds were concentrated by a vacuum distillation of the oily precipitate, using a liquid air trap as the receiver.

In control experiments, distilled water treated in the same way as above with sesame oil and ferric chloride gave a steam distillate which was completely inodorous; and treatment of river water with ferric chloride alone was ineffective and produced a precipitate which contained no evil smelling volatile substances.

*Table I*

| Liters of water used | Amount of oil added, mg./l. | Ferric chloride added, mg./l. | Treatment of the precipitate | Scent of the more volatile products obtained from the precipitate |
|---|---|---|---|---|
| 3 | 0 | 12 | steam distillation | inodorous. |
| 3 | 20 | 12 | do | strongly smelling. |
| 3 | 0 | 12 | do | inodorous. |
| 3 | 20 | 12 | do | strongly smelling. |
| 5 | 20 | 12 | vacuum distillation | Do. |
| 5 | 0 | 12 | do | inodorous. |
| 5 | 20 | 12 | do | strongly smelling. |
| 5 | 0 | 12 | do | inodorous. |

While the invention has been described in connection with selected embodiments, it will be understood that it is capable of obvious variations.

In the light of the foregoing description, the following is claimed:

1. Method of treating water containing a low concentration of at least one organic compound in order to remove and recover said compound which comprises adding to the water 2 to 50 grams of an emulsifiable fatty acid oil per 1000 kilograms of water, the concentration of said organic compound in the water being of substantially the same order of magnitude as the concentration of said oil, agitating the oil and water to establish a stable oil-in-water emulsion wherein the oil particles in said emulsion sorb said organic compound to form particles of an oil-organic compound system, said emulsion being non-self breaking, insuring that said emulsion has a pH of 6 to 8, dispersing ferric chloride into the emulsion to form an iron-containing precipitate therein, the particles of said system thereupon adhering to the particles of said precipitate and the adherent particles settling in the water as filterable material, thereby breaking the emulsion, removing from the water said adherent particles, separating from the adherent particles said organic compound, and recovering the latter.

2. Method of treating water containing a low concentration of an organic substance in order to remove such substance therefrom which comprises adding to the water about 2 to about 1000 grams of an emulsifiable oil per 1000 kilograms of water, the concentration of said organic substance in the water being of substantially the same order of magnitude as the concentration of said oil, forming the oil and water into a stable oil-in-water emulsion wherein the oil particles in said emulsion sorb the organic substance to form particles of an oil-organic substance system, dispersing in the emulsion a hydrolyzable, water-soluble salt of a heavy metal selected from the class consisting of bivalent and tervalent metals to form a precipitate therein, the particles of said system thereupon adhering to the particles of said precipitate and the adherent particles settling in the water as filterable material, thereby breaking the emulsion, removing from the water said adherent particles, separating from said adherent particles said organic substance, and recovering the latter.

3. Method according to claim 2 in which said salt is one of a bivalent metal.

4. Method according to claim 2 in which said salt is one of a tervalent metal.

5. Method of treating water having a low concentration of an organic substance which comprises adding to the water about 2 to about 1000 grams of an emulsifiable oil per 1000 kilograms of water, the concentration of said organic substance in the water being of substantially the same order of magnitude as the concentration of said oil, forming the oil and water into a stable oil-in-water emulsion wherein the oil particles in said emulsion attract the organic substance to form an oil-organic substance system, said emulsion being non-self breaking, and then breaking the emulsion into phases one of which comprising said system is settlable and one of which comprises water.

6. Method of treating water containing a low concentration of an organic substance in order to remove such substance therefrom which comprises adding to the water about 2 to about 1000 grams of a fatty acid oil per 1000 kilograms of water, the concentration of said organic substance in the water being of substantially the same order of magnitude as the concentration of said oil, finely dividing the oil in the water wherein the oil particles sorb the organic substance to form particles of an oil-organic substance system, dispersing in the water containing said oil-organic substance system a hydrolyzable, water-soluble salt of a heavy metal selected from the class consisting of bivalent and tervalent metals to form a precipitate, the particles of said system thereupon adhering to the particles of said precipitate, and removing the adherent particles from the water.

7. Method according to claim 2 in which said emulsion is formed by the aid of an emulsifying agent incorporated with said oil and water.

8. Method according to claim 2 in which said emulsion is formed by first adding said oil to a portion of said water, emulsifying the resulting mixture, and then adding the emulsified mixture to the balance of the water.

(References on following page)

References Cited in the file of this patent

UNITED STATES PATENTS

| | | |
|---|---|---|
| 1,847,413 | Pollock | Mar. 1, 1932 |
| 1,955,065 | Hawley | Apr. 17, 1934 |
| 1,995,965 | Davidson et al. | Mar. 26, 1935 |
| 2,043,102 | Kester | June 2, 1936 |
| 2,073,248 | Molinari | Mar. 9, 1937 |
| 2,076,126 | Guinot | Apr. 6, 1937 |
| 2,156,346 | Martin | May 2, 1939 |
| 2,318,714 | Robertson et al. | May 11, 1943 |
| 2,526,508 | Scheeline et al. | Oct. 17, 1950 |
| 2,537,658 | Dornte | Jan. 9, 1951 |

FOREIGN PATENTS

| | | |
|---|---|---|
| 504,337 | Germany | Aug. 2, 1930 |

OTHER REFERENCES

Dunstan, et al.; J. Soc. Chem., Ind., vol. 44, No. 35, Aug. 28, 1925, pp. 439–40T.